May 20, 1969        L. JANSEN        3,445,179
METHOD AND DEVICE FOR INHIBITING CORROSION IN STERILIZERS
Filed Dec. 14, 1965        Sheet _1_ of 2
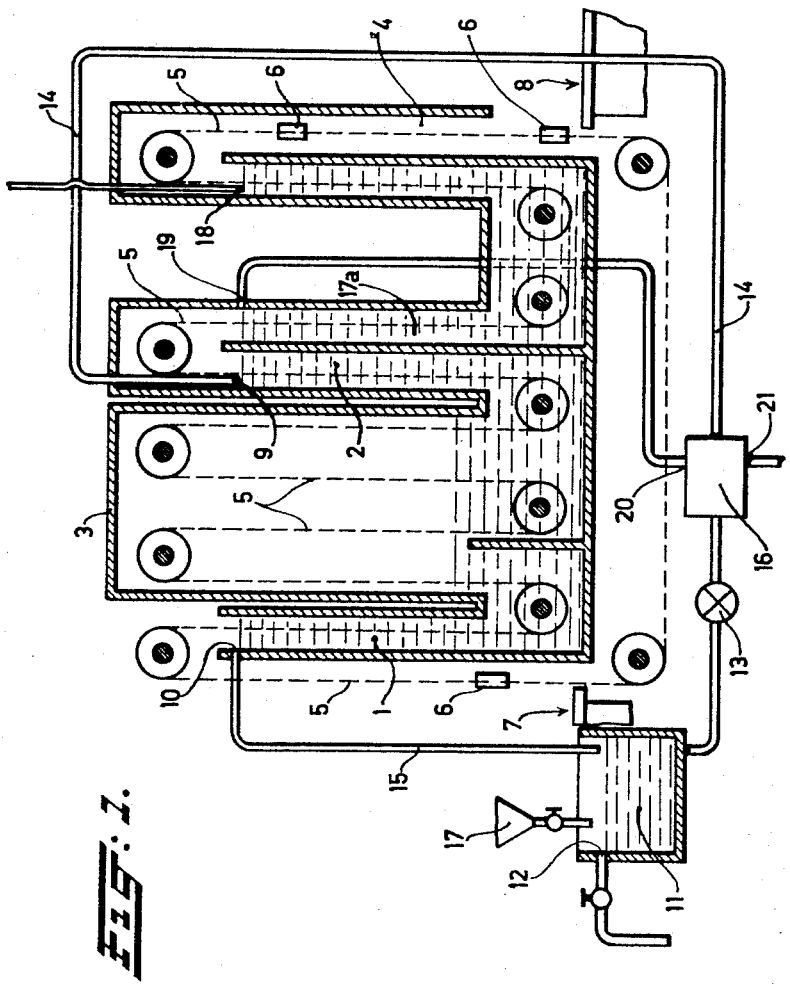
INVENTOR:
LODEWIJK JANSEN
BY
Breitenfeld & Levine
ATTORNEYS

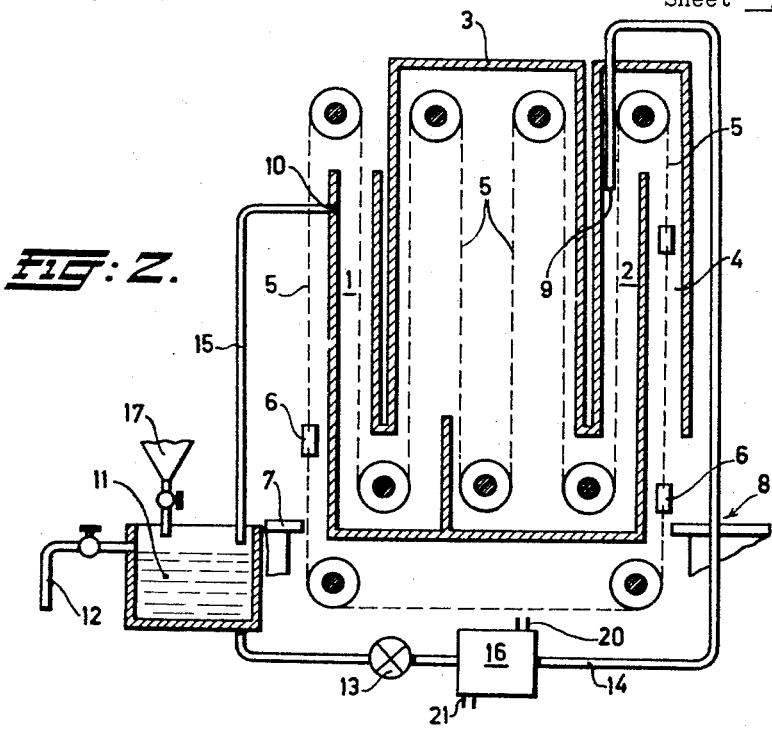
FIG: 2.
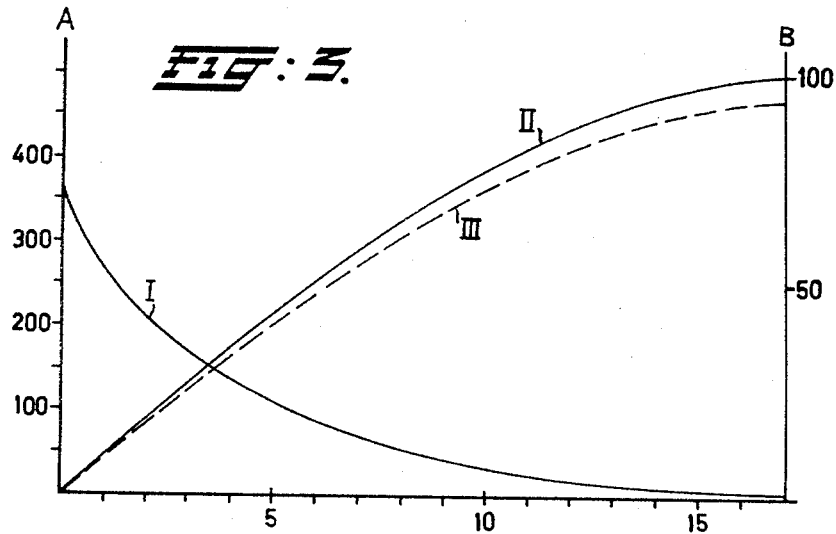
FIG: 3.
INVENTOR:
LODEWIJK JANSEN
BY
Breitenfeld & Levine
ATTORNEYS United States Patent Office 3,445,179
Patented May 20, 1969

3,445,179
METHOD AND DEVICE FOR INHIBITING CORROSION IN STERILIZERS
Lodewijk Jansen, St. Anthonis, Netherlands, assignor to Gebroeders Stork & Co. Apparatenfabriek N.V., Amsterdam, Netherlands
Filed Dec. 14, 1965, Ser. No. 513,749
Claims priority, application Netherlands, Dec. 15, 1964, 6414570
Int. Cl. C23f *14/02*
U.S. Cl. 21—2.7                                    4 Claims

ABSTRACT OF THE DISCLOSURE

Articles to be sterilized are moved through a water-filled U-shaped feed tube into and through a closed steam sterilization zone, and out therefrom through a water-filled U-shaped discharge tube. Overflow water from the feed tube is delivered to the discharge tube, and metered quantities of a sequestration agent are added to this water.

---

The invention relates to a method for inhibiting corrosion in sterilizers for the sterilization of commodities in closed containers, sterilization being effected in an over-pressure steam space communicating with a separate U-shaped feed tube and discharge tube for the containers, the water destined for cooling and heating the containers and to which a sequestration agent has been added being consecutively passed, opposite to the direction of movement of the containers, through the discharge tube for the containers, the over-pressure steam space and the feed tube for the containers.

In such a method for the continuous sterilization of filled containers steam condenses during the heating of the containers in the over-pressure steam space. Owing to the presence of small quantities of oxygen and carbonic acid in the steam this condensate is very aggressive and gives rise to corrosion, which, however, can be completely avoided by adding polymeric phosphate compounds like sodiumhexametaphosphate. Often this polymeric phosphate compound is added to the water which is passed through the discharge tube for the containers in opposition to the direction of transport in order to cool the containers. The water heated on cooling down the containers flows through the over-pressure steam space and subsequently through the feed tube for the containers, the supplied containers being pre-heated by the heated water.

Since in general hard water is fed to the discharge tube for the containers as a cooling medium, the heating of the water gives rise easily to the decomposition of calcium bicarbonate and magnesium bicarbonate, respectively, into calcium carbonate and magnesium carbonate, respectively, which deposits on the inner parts of the apparatus and on the containers. In order to prevent this process a quantity of a polymeric phosphate compound should be added such that both the formation of deposits and the corrosion are prevented. Especially if large quantities of very hard water are applied the consumption of polymeric phosphate compounds is too great from the economical viewpoint, e.g. at a consumption of 25 m.³ of cooling water per hour with a hardness equivalent to 370 p.p.m. in $CaCo_3$ and a dosage of polymeric phosphate compounds of 50 g./m.³ a quantity of 1250 grams of polymeric phosphate per hour will be required.

A further disadvantage is, however, the inevitable decomposition of polymeric phosphate compounds into orthophosphate compound especially in the event of greater dosages, giving rise to the formation of deposits of insoluble Ca- and Mg-orthophosphate compounds, respectively, which deposit on the containers and in the apparatus.

In order to obviate these disadvantages it has already been suggested to refrain from passing the cooling water, supplied through the discharge tube for the containers, through the entire circuit, but to discharge same before the over-pressure steam space. This is advantageous in that the cooling water is heated to a considerably lesser extent, so that the Ca- and Mg-bicarbonate is decomposed more slowly and also the hydrolysis of the polymeric phosphate compounds is strongly reduced, so that less polymeric phosphate compounds suffices in order to prevent corrosion and the formation of deposits owing to insoluble salts.

This is, however, disadvantageous in that the original water in the feed tube and discharge tube for the commodities is steadily diluted by aggressive steam condensate from the over-pressure steam space, whereby again in another way polymeric phosphate compounds should be added, so that no real economy on the latter substance is obtained.

It is now an object of the invention to obviate these difficulties by purposely having the water in the feed tube and discharge tube for the containers ousted gradually by the condensate formed in the over-pressure steam space. According to the invention a part of the water discharged through the feed tube for the containers is returned to the discharge tube for the containers, and the concentration of the sequestration agent in the water circuit between the water inlet and water outlet is regulated in such a way that in this circuit the solubility product of calcium phosphate cannot be exceeded at any time.

The result is that in the sterilization circuit constituted by the feed tube for the containers, the over-pressure steam face and the discharge tube for the containers, very high concentrations of polymeric phosphates, e.g. ranging from 50 to 200 mg./l. $P_2O_5$, can be obtained, which because of the low hardness value of the water almost exclusively serve for inhibiting the corrosion.

It appears further that the hydrolysis of polymeric phosphate compounds caused by the high temperature gives rise to some extent to the phosphatization of the surface of the steel used for the construction so that a firm corrosion-proof film is obtained. This inhibitor film is even so firm that the addition of inhibitors to the water in the cooling section can be omitted. It has been found in practice that at a consumption of steam of 800 kg./h. at a maximum concentration of 100 mg./l. of $P_2O_5$ only 400 g. of polymeric phosphate compound should be added to the water formed, whereas for the treatment of the cooling water a quantity of 1250 g./h. is required.

The invention comprises also a device for performing the method described hereinbefore, said device comprising an over-pressure steam space provided with an U-shaped feed tube and discharge tube for the containers; means for consecutively conveying said containers through said feed tube for the containers an over-pressure steam space for sterilizing said containers and said discharge tube for said containers metering means for the sequestration agent to be added and means for returning a part of the water flowing from said feed tube to said discharge tube for the containers.

The means for returning a part of the water consist preferably of a pump connected with pipes which on the one hand open into said discharge tube for the containers and on the other hand into said feed tube for the containers, whereby in a simple way known devices can be adapted to the application of the method according to the invention.

According to a preferred embodiment of the device, cooling means, like a heat exchanger, are accommodated for returning a part of the water. In this way said discharge tube for the containers continues to function as a cooling member.

The invention will now be illustrated with reference to the drawing in which an embodiment of a device according to the invention is represented.

FIGURE 1 represents in outline a device in which the discharge tube for the containers is composed of two parts, and FIGURE 2 represents in outline a device according to the invention, wherein the discharge tube of the containers comprises one part.

FIGURE 3 is a diagram in which the concentration of the calcium ions and the concentration of the sequestration agent, polymeric phosphate, is represented in respect of the time.

FIGURES 1 and 2 show an over-pressure steam space 3 provided with a U-shaped feed tube 1 and a discharge tube 2 for the containers. The U-shaped tube 2 opens into a discharge shaft 4 for the discharge of the sterilized containers. The feed tube 1 and the discharge tube 2 communicate with the atmosphere and serve, when filled with water, as a water seal for the over-pressure steam space 3, in which the containers are sterilized.

The containers are conveyed by means of an installation consisting of an endless chain 5 provided with carriers 6 for the containers in which the containers are accommodated during transport through the feed tube 1 for the commodities, the over-pressure steam space 3 and a discharge tube 2 for the commodities. The containers are put in the container carriers 6 at the filling station 7, the discharge being effected at the discharge station 8.

In the known devices cooling water is fed to the discharge tube 2 at the location of the feed orifice 9, the water thereupon flowing through the over-pressure steam space 3 and finally being discharged through the supply tube 1 for the containers at the discharge orifice 10.

The great disadvantages of a water flow from the feed orifice 9 via over-pressure steam space 3 and supply tube 1 for the containers is in that, especially in the event of hard water, the consumption of sequestration agents is enormous.

The device according to the invention comprises means for returning a part of the water, which at the location of the discharge orifice 10 flows from the feed tube 1 for the containers, to the discharge tube 2 for the containers at the location of the feed orifice 9, said means consisting of a reservoir 11 communicating with the supply tube 1 and the discharge tube 2 for the containers, and a pump 13, the reservoir being provided with a level regulator 12 and connected by means of a pipe 14 with the feed orifice 9, while in general the discharge orifice 10 of the feed tube 1 for the container opens above or via the pipe 15 into the reservoir 11. The reservoir 11 is furthermore provided with a metering member 17 for continuously or periodically adding a sequestration agent to the reservoir 11. By means of the level regulator 12 the level in the reservoir 11 is regulated, while the quantity of liquid flowing on via the discharge orifice 10 partially flows off via the overflow 12 constructed as a level regulator.

The level regulator 12 is disposed in the reservoir 11 in a way such that same can at least contain a quantity of water sufficient to supply the quantity of liquid required for a constant liquid level at the time that no containers to be sterilized are in the water circuit constituted by the discharge tube, the supply tube and the over-pressure steam space.

In some cases the reservoir 11 can advantageously be omitted, especially in the event of an over-pressure steam space with a large bottom surface and a small diameter of the discharge- and feed tube for the commodities. In that case the change of the level in the over-pressure steam space is so small, if water is drawn therefrom in order to compensate for the volume of the containers when same disappear, that this has no harmful effect. In that case the return means consist of the pump 13, the pipe 15 and the pipe 14.

The pipe 15 opens then preferably into the feed tube 1 for the commodities and under the water level, while the water flowing off at 10 is discharged towards the sewer.

Represented in FIGURE 1 is a device analogous to that shown in FIGURE 2, but in this case the discharge tube 2 for the containers is supplemented by an U-shaped tube 17a, in which the containers are cooled with hard water having a hardness equivalent to 370 p.p.m. in $CaCO_3$. This cooling water is supplied at the outlet 18 and flows off at the inlet 19.

According to a preferred embodiment this flowing off cooling water is passed through the heat exchanger 16 for cooling the water flowing from the feed tube 1 for the commodities, which water at the feed orifice 9 is returned to the discharge tube 2 for the commodities. For that purpose the heat exchanger is provided with an inlet 20 and an outlet 21.

The device operates as follows: At the filling station 7 the containers to be sterilized are introduced into the carriers on the chain 5. This endless chain 5 is advanced by means of a drive (not shown), the containers by way of the supply tube 1 for the containers being passed through the over-pressure steam space 3 and finally leaving the device via the discharge tube 2 for the commodities and the discharge shaft 4 in order to be delivered at the discharge station 8. In the device according to FIGURE 1 the containers are subsequently cooled by cooling water in the U-shaped tube 17a.

At the start of the sterilization, water is introduced into the circuit between the inlet 19, the U-shaped discharge tube 2 for the commodities, the over-pressure steam space 3, the supply tube 1 for the commodities and the discharge orifice 10, the over-pressure in the over-pressure steam space 3 being determined by the quantity of water.

The condensate formed during sterilization is mixed with the water which is already in the over-pressure steam space 3. Due to the action of the pump 13 water will issue from the discharge orifice 10 and is received in the reservoir 11, which water by means of the pump 13 and the pipe 14 is returned to the circuit at the feed orifice 9. The adjustment of the level regulator 12, which is constructed as an overflow, allows a definite quantity of the water issuing from the feed tube for the containers to flow from the reservoir 11, the remaining water, after a sequestration agent has been added via the metering member, being returned to the circuit by way of the feed orifice 9.

Due to the condensation of steam in the over-pressure steam space 3 and at a constant supply of containers water will continuously flow from the feed tube for the containers, only a part thereof being returned again at 9. After some time both the supply tube 1 and the discharge tube 2 for the containers are entirely filled with condensate, which corresponds to softened water and consequently would be very aggressive, but which as a consequence of the addition of a sequestration agent via the metering member 17 possesses such a concentration thereof that no corrosion is produced, while the containers in general enter the U-shaped tube 17a in a sufficiently cooled condition, in such a way that no decomposition of bicarbonates and consequently a formation of unwanted deposits is produced.

The sequestration agent is metered in such manner by means of the member 17 that, on mixing the condensate with the hard water present, in the communicating feed tube 1 and discharge tube 2, the solubility product of calcium phosphate is never exceeded. This means that in the beginning rather low concentrations of sequestration agent are present, but that these concentrations can increase to a desired maximum value accordingly as the concentration of Ca ions decreases as appears from FIGURE 3.

In this figure the left axis of ordination represents the total hardness of the water in p.p.m. $CaCo_3$; the right axis of ordination the phosphate content in $P_2O_5$, the axis of the abscissae the time of working; curve I the total hardness, curve II the total $P_2O_5$ content and curve III the quantity of $P_2O_5$ bound as polymer phosphate compound.

I claim:

1. A method of inhibiting corrosion in a steam sterilizer wherein articles are sterilized in a closed heated steam sterilization zone, the sterilizer having a water-filled U-shaped feed tube through which the articles to be sterilized enter the sterilization zone, and a water filled U-shaped discharge tube through which the sterilized articles leave the sterilization zone, each of said U-shaped tubes having an inner leg in communication with said sterilization zone and an outer leg in communication with the atmosphere, the articles being sterilized by passing them through the feed tube, into and through the sterilization zone, and out therefrom through the discharge tube, said method comprising the steps of supplying at least a portion of the water, which normally flows from the outer leg of the feed tube, to the outer leg of the discharge tube, and adding a polymeric phosphate sequestration agent to the water as it flows from the feed tube to the discharge tube, the sequestration agent being added in an amount such that the solubility product of calcium phosphate is never exceeded.

2. A steam sterilizer comprising a closed heated steam sterilization chamber, water filled U-shaped feed and discharge tubes each having an inner leg in communication with said chamber and an outer leg in communication with the atmosphere, means for conveying articles through said feed tube into and through said chamber and out therefrom through said discharge tube, an overflow outlet in the outer leg of said feed tube through which water flows from said feed tube, circuit means for supplying at least a portion of the overflow water from said feed tube to the outer leg of said discharge tube, and means for adding metered quantities of a sequestration agent to the water flowing through said circuit means.

3. A sterilizer as defined in claim 2 wherein said circuit means includes a reservoir, means for delivering water from said overflow outlet to said reservoir, and means for supplying liquid from said reservoir to the upper part of said discharge tube, and wherein said metering means adds the sequestration agent to the liquid in said reservoir.

4. A sterilizer as defined in claim 3 including regulator means for controlling the level of liquid in said reservoir.

References Cited

UNITED STATES PATENTS

| | | | |
|---|---|---|---|
| 2,370,472 | 2/1945 | King | 21—58 |
| 2,660,512 | 11/1953 | Webster | 21—56 |
| 3,372,110 | 3/1968 | Fuchs | 21—2.7 XR |
| 3,377,173 | 4/1968 | Van Der Winden | 99—214 |
| 3,407,721 | 10/1968 | Carvallo | 99—249 |

FOREIGN PATENTS

| | | |
|---|---|---|
| 704,446 | 2/1954 | Great Britain. |
| 814,508 | 6/1959 | Great Britain. |

MORRIS O. WOLK, *Primary Examiner.*

BARRY S. RICHMAN, *Assistant Examiner.*

U.S. Cl. X.R.

21—56, 58, 80, 91, 94, 103, 78; 99—214, 215, 249, 362; 122—379; 210—57